Patented Apr. 5, 1932

1,852,244

UNITED STATES PATENT OFFICE

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE

METHOD OF PRODUCING ROSIN OILS

No Drawing.  Application filed May 19, 1927.  Serial No. 192,801.

My invention relates to a method for the production of rosin oils both acid and neutral and by which neutral rosin oil may be produced directly.

Rosin oils having high acid numbers have heretofore been produced by decomposing rosin at high temperatures and it has been known to produce a neutral rosin oil, by the treatment of rosin with heat and a substance as, for example, hydriodic acid or iron turnings. Neutral rosin oils, and rosin oils of low acid number, are obtained by redistillation of rosin oils of higher acid number, separating the cuts which are substantially free from rosin acids. The rosin oil is sometimes distilled over alkali in order to free it entirely from rosin acids.

An ordinary commercial neutral rosin oil, as produced by the decomposition of rosin with heat, has an acid number of "3", a specific gravity of about 0.978 and a boiling range such that 10% distills over at 331° C., 50% at 346° C. and 90% at 370° C. Neutral rosin oil is free from rosin acids, composed entirely of hydrocarbons, has a boiling range of approximately 300° C.-375° C., a specific gravity within the range 0.96-0.98, say about 0.97, and when thoroughly refined has practically no acid number. Neutral rosin oil has a considerable optical rotation, a specific rotation of +5.5° having been observed by me.

Now it is the object of my invention broadly to provide a method for the production of rosin oils, both acid and neutral, which involves the treatment of rosin with small proportions of fuller's earth. More specifically, the method embodying my invention involves the treatment of rosin with fuller's earth and heat with the distillation off of rosin oil and still more specifically the subjection of rosin to a preliminary treatment with fuller's earth and heat with subsequent direct distillation off of a neutral, or substantially neutral, rosin oil.

The process embodying my invention will permit the production of an acid rosin oil at a lower temperature and in a shorter heating period than the present practice, since fuller's earth is an excellent catalyst for the conversion of rosin into rosin oil. If it is desired to obtain a neutral oil, it is only necessary to heat for a longer period, or to employ a somewhat higher temperature, or to use a larger proportion of fuller's earth. By proper control of the foregoing factors, rosin oils may be obtained having acid numbers ranging from 75 to zero. Thus in one operation substantially all of the abietic acid in the rosin may be converted either into a neutral rosin oil, or into an oil having the desired acid number.

In accordance with my invention, I produce a rosin oil by heating either gum or wood rosin in any suitable apparatus, to which is added a quantity of fuller's earth, say 2%. The rosin should be heated, under atmospheric pressure, to a temperature within the range 150° C.-325° C., preferably a temperature of about 300° C. The conversion into rosin oil occurs at temperatures as low as 150° C. The treatment with the fuller's earth will cause conversion into rosin oil. The rosin oil recovered may be acid, but will contain some neutral oil as indicated by the fact that the acid number of the rosin oil will be found to be lower than that of the original rosin. The treatment of the rosin with fuller's earth will result in the conversion of the rosin into rosin oil at a substantially lower temperature than when the conversion is sought to be effected by heat alone.

If it be desired to recover the neutral oil from the rosin oil, such may be accomplished by fractionation or by neutralizing the acid present and distilling.

In accordance with my invention, where it is desired to produce neutral rosin oil from rosin directly, the rosin in admixture with fuller's earth is subjected to a preliminary treatment at a temperature within the range of about 150° C.-325° C., preferably about 300° C. and subsequently the neutral oil is distilled off. During the preliminary treatment there should be no substantial distillation of the rosin, though the light rosin spirit amounting to say about 5% of the rosin, should be allowed to distill off. The preliminary treatment should be continued for a period of say from about 2-20 hours, depending upon the amount of fuller's earth used and the temperature to which the rosin is heated. As an example of the carrying out of the method embodying my invention 500 g. of wood rosin having an acid number of 155, to which is added 15 g. of fuller's earth is heated, at a temperature of say 300° C.–325° C. for a preliminary period of about 4 hours under atmospheric pressure. The preliminary heating of the rosin and fuller's earth is carried on without substantial distillation of the rosin. However, during the preliminary heating about 30 g. of oil, consisting chiefly of light rosin spirit, is distilled off.

In the preliminary heating of the rosin and fuller's earth, the main reaction may be expressed, for example, as follows—

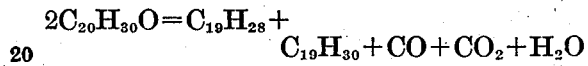

The preliminary heating results in the production of a crude product, which is then subjected to distillation. Distillation of the crude product may be effected by continuing the heating with reduction of the pressure; for example, the pressure may be reduced to about 1″ of Hg. and about 265 g. of substantially neutral rosin oil having a specific gravity of 0.975, a boiling range such that about 10% will distill off at 310° C., 50% at 340° C. and 90% at 365° C. and with an acid number of 2, will be recovered. The residue, after distillation, will comprise about 150 g. of pitch. The latter may be partially broken down into rosin oil by heating to approximately 400° C.

While for many purposes it is desirable to fractionate the crude product, for some purposes it may be preferable to utilize the crude product without separation into rosin oil and pitch, merely filtering or decanting the crude product from the fuller's earth. The crude product is a very viscous oil, having a density of 0.99–1.01.

In the carrying out of the process for the direct production of neutral oil embodying my invention, if it be found after the preliminary heat treatment of the rosin with fuller's earth that the crude product contains too large an amount of rosin acids, separation may be effected, by distilling off the neutral oil through a short fractionating column, thus causing the higher boiling acids, if any are present, to remain in the still; the rosin acids may be subsequently distilled off as a higher boiling cut. It is usually preferable, however, to continue heating with the fuller's earth for a short time in order to decrease the acidity to the desired value.

In case it is desired to produce an acid oil, the heating period, previous to distillation, is greatly shortened, e. g. heating to around 250° C. for one-half hour, followed by distillation under reduced pressure, gave an oil having an acid number of approximately 50.

In carrying out the process embodying my invention, some varieties of argillaceous earths other than fuller's earth may be employed and other surface catalysts such as certain grades of activated carbon and some grades of siliceous earths as, for example, filtrol, may be used and it will be understood that in referring to fuller's earth I intend to include other argillaceous and siliceous earths and activated carbons as equivalents of fuller's earth.

Having now fully described my invention, what I claim and desire to protect by Letters Patent is:—

1. The method of producing rosin oil, which includes subjecting rosin to treatment with heat in the presence of an appreciable amount of fuller's earth, at a temperature at which rosin will be decomposed until substantial decomposition of rosin has been effected, while avoiding substantial distillation of the rosin.

2. The method of producing neutral rosin oil, which includes subjecting rosin to treatment with heat in the presence of an appreciable amount of fuller's earth, at a temperature at which rosin will be decomposed, until substantial decomposition of rosin has been effected, while avoiding substantial distillation of the rosin, and subsequently distilling off neutral rosin oil from the treated rosin.

3. The method of producing rosin oil, which includes subjecting rosin to treatment with heat at a temperature within the range 150°–325° C. in the presence of an appreciable amount of fuller's earth until substantial decomposition of rosin has been effected, while avoiding substantial distillation of the rosin, and subsequently distilling off rosin oil from the treated rosin.

4. The method of producing rosin oil, which includes subjecting rosin to treatment with heat at a temperature of about 300° C. in the presence of an appreciable amount of fuller's earth until substantial decomposition of rosin has been effected, while avoiding substantial distillation of the rosin, and subsequently distilling off rosin oil from the treated rosin.

5. The method of producing neutral rosin oil, which includes subjecting rosin to treatment with heat at a temperature within the range 150°–325° C., under pressure not less than atmospheric in the presence of an appreciable amount of fuller's earth until substantial decomposition of rosin has been effected, while avoiding substantial distillation of the rosin, and then reducing the pressure and distilling off neutral rosin oil from the treated rosin.

6. The method of producing rosin oil, which includes subjecting rosin to treatment with heat in the presence of an appreciable amount of fuller's earth, but substantially less in amount than the weight of rosin treated, at a temperature at which rosin will be decomposed until substantial decomposition of rosin has been effected, while avoiding substantial distillation of the rosin.

7. The method of producing rosin oil, which includes subjecting rosin to treatment with heat in the presence of about 2% of fuller's earth at a temperature at which rosin will be decomposed until substantial decomposition of rosin has been effected, while avoiding substantial distillation of the rosin.

8. The method of producing rosin oil, which includes subjecting rosin to treatment with heat in the presence of an appreciable amount of fuller's earth, but substantially less in amount than the weight of rosin treated, at a temperature at which rosin will be decomposed until substantial decomposition of rosin has been effected, while avoiding substantial distillation of the rosin, and subsequently distilling off rosin oil from the treated rosin.

9. The method of producing rosin oil, which includes subjecting rosin to treatment with heat in the presence of about 2% of fuller's earth at a temperature at which rosin will be decomposed until substantial decomposition of rosin has been effected, while avoiding substantial distillation of the rosin, and subsequently distilling off rosin oil from the treated rosin.

In testimony of which invention, I have hereunto set my hand at Kenvil, N. J., on this 17th day of May, 1927.

IRVIN W. HUMPHREY.